US008747505B2

(12) United States Patent
Crabtree et al.

(10) Patent No.: US 8,747,505 B2
(45) Date of Patent: Jun. 10, 2014

(54) V-BANK AIR FILTRATION SYSTEM SUCH AS FOR ANIMAL CONFINEMENT

(75) Inventors: LaMonte A. Crabtree, LaGrange, KY (US); Richard K. Chesson, Jr., Louisville, KY (US); Ronald J. Geil, Jr., LaGrange, KY (US)

(73) Assignee: Clarcor Air Filtration Products, Inc., Jeffersonville, IN (US)

( * ) Notice: Subject to any disclaimer, the term of this patent is extended or adjusted under 35 U.S.C. 154(b) by 338 days.

(21) Appl. No.: 13/165,379

(22) Filed: Jun. 21, 2011

(65) Prior Publication Data

US 2011/0308210 A1 Dec. 22, 2011

Related U.S. Application Data

(60) Provisional application No. 61/357,437, filed on Jun. 22, 2010.

(51) Int. Cl.
*B01D 46/00* (2006.01)

(52) U.S. Cl.
USPC .......... 55/490; 55/482; 55/483; 55/484; 55/493; 55/502; 55/511; 55/DIG. 31

(58) Field of Classification Search
USPC .......... 55/482, 483, 484, 493, 497, 521, 490, 55/502, 511, DIG. 31
See application file for complete search history.

(56) References Cited

U.S. PATENT DOCUMENTS

| | | | |
|---|---|---|---|
| 3,624,161 A | 11/1971 | Bub | |
| 3,744,216 A | 7/1973 | Halloran | |
| 3,793,813 A | 2/1974 | McAllister | |
| 3,925,043 A | 12/1975 | Matrone et al. | |
| 4,225,328 A | 9/1980 | Stiehl | |
| 4,810,269 A | 3/1989 | Stackhouse et al. | |
| 4,865,637 A | 9/1989 | Gruber | |

(Continued)

FOREIGN PATENT DOCUMENTS

| | | |
|---|---|---|
| CA | 2036639 A1 | 9/1991 |
| DE | 19755466 A1 | 6/1999 |

(Continued)

OTHER PUBLICATIONS

U.S. Appl. No. 61/490,896, filed May 27, 2011, Crabtree et al.

(Continued)

*Primary Examiner* — Robert Clemente
(74) *Attorney, Agent, or Firm* — Reinhart Boerner Van Deuren P.C.

(57) ABSTRACT

A filter system includes a housing having an inlet opening surrounded by a sealing surface, an outlet opening, and a door having a seating surface surrounding a through-port opening. The door is movable between an open and closed position and a closed position. In an embodiment, a hinge connects the door to the housing, such that the door pivots between open and closed positions about the hinge. A panel pre-filter is seated along the seating surface of the door. A V-bank filter is positioned in the inlet opening, and has a flange in general alignment with the sealing surface, and has a plurality of filter media sections projecting away from the flange and into the housing interior. A latch is adapted to keep the panel pre-filter positioned inline and upstream of the V-bank filter. A seal is disposed between the flange of the V-bank filter and the sealing surface.

19 Claims, 11 Drawing Sheets

(56) References Cited

U.S. PATENT DOCUMENTS

| | | |
|---|---|---|
| 5,288,298 A | 2/1994 | Aston |
| 5,290,345 A | 3/1994 | Osendorf et al. |
| 5,290,447 A | 3/1994 | Lippold |
| 5,322,213 A | 6/1994 | Carter et al. |
| 5,351,846 A | 10/1994 | Carter |
| 5,476,526 A | 12/1995 | Attermeyer |
| 5,496,389 A | 3/1996 | Wilcox |
| 5,501,794 A | 3/1996 | Van de Graaf et al. |
| 5,512,172 A | 4/1996 | Marble |
| 5,531,892 A | 7/1996 | Duffy |
| 5,593,470 A | 1/1997 | Shagott et al. |
| 5,622,543 A | 4/1997 | Yang |
| 5,690,719 A | 11/1997 | Hodge |
| 5,792,229 A | 8/1998 | Sassa et al. |
| 5,804,014 A | 9/1998 | Kähler |
| 5,810,898 A | 9/1998 | Miller |
| 5,820,646 A | 10/1998 | Gillingham et al. |
| 5,853,445 A | 12/1998 | Wong et al. |
| 5,908,598 A | 6/1999 | Rousseau et al. |
| 6,099,612 A | 8/2000 | Bartos |
| 6,152,996 A | 11/2000 | Linnersten et al. |
| 6,156,089 A | 12/2000 | Stemmer et al. |
| 6,174,342 B1 | 1/2001 | Jeanseau |
| 6,179,891 B1 | 1/2001 | Knudsen et al. |
| 6,203,592 B1 | 3/2001 | Carawan |
| 6,214,076 B1 | 4/2001 | Beier et al. |
| 6,293,983 B1 | 9/2001 | More |
| 6,312,489 B1 | 11/2001 | Ernst et al. |
| 6,315,805 B1 | 11/2001 | Strauss |
| 6,319,307 B1 | 11/2001 | Shanks et al. |
| 6,321,637 B1 | 11/2001 | Shanks et al. |
| 6,348,085 B1 | 2/2002 | Tokar et al. |
| 6,361,577 B1 | 3/2002 | Unrath et al. |
| 6,406,657 B1 | 6/2002 | Eitzman et al. |
| 6,419,871 B1 | 7/2002 | Ogale |
| 6,447,566 B1 | 9/2002 | Rivera et al. |
| 6,685,833 B2 | 2/2004 | Lippold |
| 6,824,581 B1 | 11/2004 | Tate et al. |
| 6,955,696 B1 * | 10/2005 | Ost et al. .......... 55/357 |
| 7,959,700 B2 | 6/2011 | Kidman |
| 8,105,409 B2 * | 1/2012 | Mann et al. .......... 55/483 |
| 2005/0150812 A1 | 7/2005 | Carter |
| 2006/0021302 A1 | 2/2006 | Bernard |
| 2009/0193773 A1 | 8/2009 | Sundvik et al. |
| 2009/0301402 A1 | 12/2009 | Devine et al. |
| 2010/0192528 A1 | 8/2010 | Mann et al. |
| 2010/0251678 A1 | 10/2010 | Mann et al. |
| 2010/0313757 A1 | 12/2010 | Crabtree et al. |
| 2010/0313760 A1 | 12/2010 | Crabtree et al. |
| 2011/0308210 A1 | 12/2011 | Crabtree et al. |

FOREIGN PATENT DOCUMENTS

| | | |
|---|---|---|
| GB | 2 252 922 A | 8/1992 |
| JP | 3146110 A | 6/1991 |
| JP | 6269624 A | 9/1994 |
| JP | 7323217 A | 12/1995 |
| JP | 08/242718 | 9/1996 |
| JP | 10-019367 A | 1/1998 |
| JP | 2008-031967 A | 2/2008 |
| KR | 20-0445119 Y1 | 6/2009 |
| WO | WO 01/93990 A1 | 12/2001 |

OTHER PUBLICATIONS

U.S. Appl. No. 13/479,765, filed May 24, 2012, Crabtree et al.
U.S. Appl. No. 13/479,791, filed May 24, 2012, Crabtree et al.
U.S. Appl. No. 13/479,841, filed May 24, 2012, Ball et al.
U.S. Appl. No. 13/479,880, filed May 24, 2012, Crabtree.
U.S. Appl. No. 13/480,018, filed May 24, 2012, Crabtree.

* cited by examiner

V-BANK AIR FILTRATION SYSTEM SUCH AS FOR ANIMAL CONFINEMENT

CROSS-REFERENCE TO RELATED PATENT APPLICATIONS

This patent application claims the benefit of U.S. Provisional Patent Application No. 61/357,437, filed Jun. 22, 2010, the entire teachings and disclosure of which are incorporated herein by reference thereto.

FIELD OF THE INVENTION

This invention generally relates to air filtrations systems used in animal confinement facilities or in other filtration applications.

BACKGROUND OF THE INVENTION

One of the concerns in agricultural animal confinement facilities, particularly in the agricultural swine industry, is the control of the spread of disease. For example, disease agents such as mycoplasma, the swine influenza virus, and the porcine reproductive and respiratory syndrome virus (PRRSV) have had a significant negative impact on swine production. It has been estimated that PRRSV alone may increase the average cost of swine production by $5.60 to $7.62 per head.

One method that has proven effective is reducing the spread of the aforementioned disease agents is filtration of the air in animal confinement facilities. For example, high-efficiency air filter have proven to be effective at reducing the rate of airborne transmission of these disease agents. One of the challenges for the swine production industry is how to best provide the needed high-efficiency air filtration in a practical manner at the lowest cost, with ease of filter change out, and with reliability for the environmental application.

V-bank filters have been used in applications involving air filtration in animal confinement facilities where both large amounts of filtration media and high air flow rates are desired. A V-bank filter typically includes two or more pairs of panel filters, for example, where each pair of adjacent panel filters is arranged in a V-shaped configuration. In these applications, the panel filters typically include pleated filter media.

Embodiments of the present invention are directed toward improvements over the state of the art.

BRIEF SUMMARY OF THE INVENTION

In one aspect, embodiments of the invention provide a filter system that includes a housing having a generally rectangular inlet opening through one side thereof, and an outlet opening through a different side. The rectangular inlet opening is surrounded by a generally rectangular sealing surface. In an embodiment, the filter system also includes a door having a generally rectangular seating surface, with the seating surface surrounding a through-port opening. The door is movable between an open position and a closed position relative to the housing, and the through port opening is aligned with the rectangular inlet opening when the door is in the closed position. In at least one embodiment, the filter system has a hinge connecting the door to the housing, and the door pivots between open and closed positions about the hinge. Further, in certain embodiments, a generally rectangular panel pre-filter is seated along the rectangular seating surface of the door, and at least one V-bank primary filter is positioned in the rectangular inlet opening. In a particular embodiment, the V-bank primary filter has a generally rectangular peripheral flange in general alignment with the generally rectangular sealing surface. Further, the V-bank primary filter has a plurality of filter media sections projecting away from the peripheral flange and into the interior of the housing. The filter system further includes a latch having cooperating components between the door and the housing, such that the latch is adapted to keep the at least one generally rectangular panel pre-filter positioned inline and upstream of the at least one V-bank primary filter. Additionally, the filter system includes a seal between the generally rectangular peripheral flange of the V-bank primary filter and the generally rectangular sealing surface.

In another aspect, embodiments of the invention provide a filter system that includes a housing having an inlet opening and an outlet opening, and a V-bank filter having a flange configured to seat against a perimeter portion of the inlet opening, and disposed between the inlet and outlet opening. In an embodiment of the invention, the filter system also includes a pivoting door configured to move between an open position and a closed position. In the closed position, the door covers the inlet opening, and, in the open position, the door allows for the removal and installation of the V-bank filter. In a particular embodiment, the filter system further includes a panel filter disposed within the pivoting door. The panel filter is configured to pre-filter air entering through the inlet opening to the V-bank filter.

In still another aspect, embodiments of the invention provide a filter system that includes a housing having an inlet opening and an outlet opening, and a V-bank filter having a flange configured to seat against a perimeter portion of the inlet opening. In an embodiment, the flange is disposed between the inlet and outlet opening. An embodiment of the filter system also includes a pair of cooperating retainers, including a first retainer and a second retainer on opposing sides of the outlet opening. Each retainer is generally step-shaped, with a mounting portion, a spacer portion and a retainer portion. The mounting portion is mounted to the housing, and the spacer portion spaces the retainer portion away from the perimeter portion in spaced relation to trap the flange of the V-bank filter therein. At least one of the retainers is movable to accommodate installation and removal of the V-bank filter. In an embodiment of the invention, a seal is disposed between the flange and the perimeter portion of the housing.

In yet another aspect, embodiments of the invention provide a replaceable V-bank filter for use with a housing having an inlet opening and an outlet opening, with the housing having an outer upstream rectangular sealing surface and upper and lower retainers defining channels therein. An embodiment of the replaceable V-bank filter includes a generally rectangular frame having a peripheral and generally rectangular flange surrounding an inlet, a generally rectangular seal means along a first side of the flange for sealing against the rectangular sealing surface of the housing, and a generally rectangular seat means along a second side of the flange for seating against the upper and lower retainer. In at least one embodiment, the generally rectangular seat means is positioned, and has sufficient depth, to facilitate compression of the generally rectangular seal means relative to the rectangular sealing surface of the housing. This compression provides for said sealing when employed in the upper and lower retainers. An embodiment of the replaceable V-bank filter has a plurality of pleated panel filters. Each panel filter is supported by the generally rectangular frame and projects in a direction away from the flange. Further, pairs of the pleated panel filters are arranged in generally V-shaped configurations, with adjacent ends of adjacent panel filters being joined by bridging sections that extend transversely relative to two opposed sides of the generally rectangular frame.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

As shown in FIGS. 1-4 below, embodiments of the present invention include a filter housing with a pivoting door and a sliding latch that permit the quick removal and installation of V-bank filter elements, but also facilitate an airtight seal between the housing and filter element. The novel filter housing configuration described herein simplifies the maintenance, provides for a practical and reliable filter replacement process, and, thus, and may lower the costs associated with the operation of animal confinement facilities.

Figure 1:
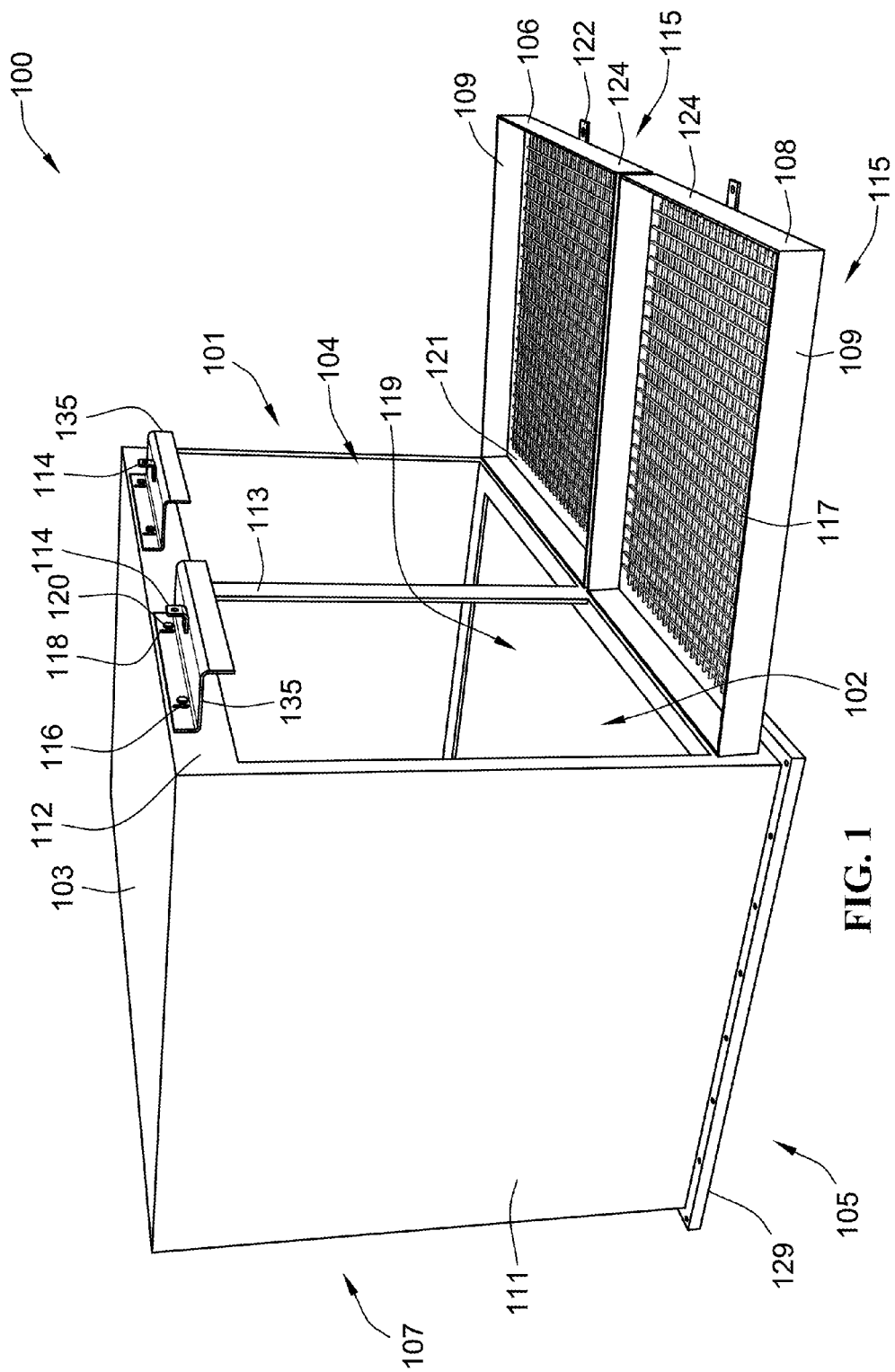
FIG. 1 is a perspective view of a filter housing constructed in accordance with an embodiment of the invention.

FIG. 1 illustrates a filter housing 100 for use in an animal confinement facility, constructed in accordance with an embodiment of the invention. In the embodiment shown, the filter housing 100 is substantially box-shaped, and may be formed from sheet metal or other suitable material. Filter housing 100 has a front side 101, a top side 103, a bottom side 105, a rear side 107, and two lateral sides 111. The front side 101 of the filter housing 100 has two rectangular openings to provide inlets, 102, 104 separated by a divider such as vertical post 113, and each configured to accept a V-bank filter element (see FIG. 3). The bottom side 105 has a large rectangular outlet opening 119 that is common to all of the inlets.

In embodiments of the inventions, the rear side 107 of the filter housing is very similar or identical to the front side 101 in terms of the inlet openings 102, 104, pivoting doors 106, 108, latching mechanisms, and filter elements employed. Therefore, for the sake of brevity, the following description of the filter housing 101 refers only to the front side 101. However, it should be noted that all of the features and elements shown and describes with respect to the front side 101 of the filter housing applies equally to the rear side 107.

Figure 6:
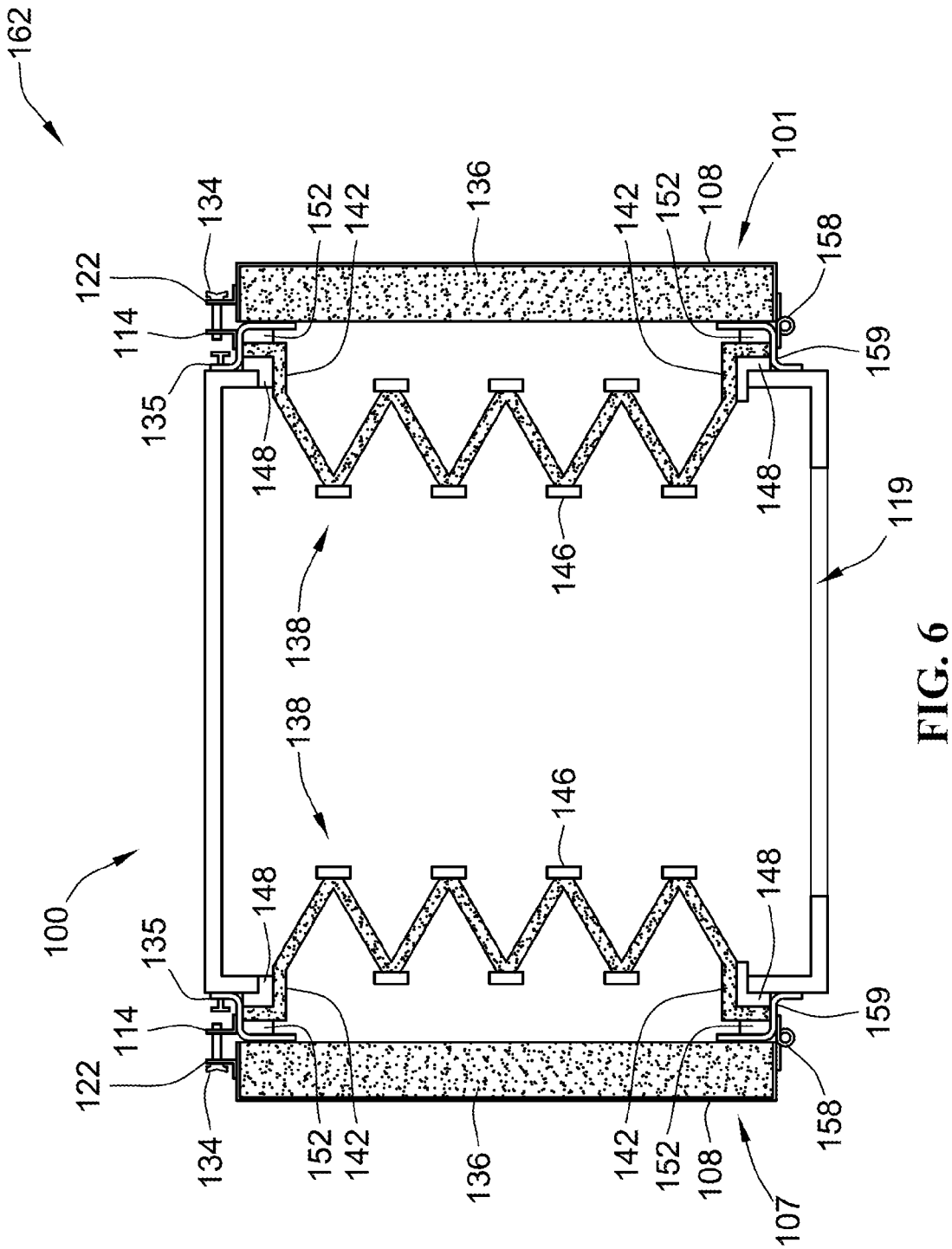
FIG. 6 is a cross-sectional view of a filter system constructed in accordance with an embodiment of the invention.

Filter housing 100 also includes two pivoting doors 106, 108 attached to the filter housing 100 via hinges (shown in FIG. 6) located along the bottom side of the two rectangular openings 102, 104. However, as will be discussed below, it is also contemplated that pivoting doors could be hinged at the top side or on the lateral sides of the two rectangular openings 102, 104. Each pivoting door 106, 108 has a rectangular frame 109 with a seating surface 121 surrounding a through-port opening 115 in which the panel pre-filters may nest. The seating surface 121 may comprise a recessed region generally facing the V-Bank filter when in the close position In at least one embodiment, the rectangular frame 109 supports a protective grate 117 along the seating surface 121 and across the through-port opening 115 such that the door 106, 108 is capable of holding a panel pre-filter 136 (shown in FIG. 3). Furthermore, in at least one embodiment, the grate 117 comprises a wire mesh grate having a plurality of horizontal and vertical wires spaced far enough apart so as not to restrict the flow of air through the filter housing 100, but also to protect the filter media and prevent the ingress of large objects.

FIG. 1 shows that along a top portion 112 of the front of filter housing 100 there are two latches 114, one disposed on each upper retainer 135. In an embodiment of the invention, each latch 114, or has a cooperating components on the corresponding door 106, 108 in the form of a first L-shaped bracket 122. As will be explained more fully below, the latch 114 is configured to work with first L-shaped bracket 122 to secure the doors 106, 108 in the closed position. In an embodiment of the invention, the latch 114 comprises a second L-shaped bracket 114.

In the embodiment of FIG. 1, one portion of the latches 114 is formed and secured upon the upper retainer 135 on the housing, and an L-shaped bracket 122 on the door. Each upper retainer 135 may be step-shaped, as shown, and each includes two slots 116 (see closeup view of FIG. 2 also), which facilitate vertical sliding adjustment and movement, which helps to facilitate installation and clamping of the V-Bank filter elements 138 in position. The slots 116 are configured such that a fastener can slide vertical when unfastened—such as a screw 118 (see closeup view of FIG. 2 also—and realizing it screws into a threaded hole in housing) with a knob 120 (see closeup view of FIG. 2 also). The knob 120 is attached at one end of the screw 118 to allow for manual adjustment can be inserted through the slot 116 and assembled to a threaded hole in the filter housing 100. The length of the slots 116 allows the upper retainer 135 to be moved up or down when the screws 118 are loosened. Also, the screw 118 is relatively long so that the upper retainer 135 can be moved in horizontally forward and away from the front of the housing 100 between unclamped and clamped positions. Thus, there are two axes of adjustment for V-bank installation and clamping—both vertical and horizontal adjustment, which also allows the upper retainer 135 to be pivoted or canted during installation to afford clearance for the upper end of a V-bank flange 142 and gaskets.

In an embodiment of the invention, each upper retainer 135 has a mounting portion 123, a spacer portion 125, and a retainer portion 127. The mounting portion 123 is attached to the top of the front side 101 of the housing 100 and defines the slots 116. The spacer portion 125 is configured to accommodate the flange 142 and gasket seals of the V-bank filter element 138. The retainer portion 127 is configured to keep the aforementioned V-bank flange 142 and associated gasket seals in sealing engagement with a seating surface 144 (shown in FIG. 3) around the perimeter of the rectangular openings 102, 104 of the housing 100. By manually actuating the knob 120, the V-bank filter element 138 can be secured and sealingly clamped with axial compression in the gaskets against the front seating surface 144 of the housing 100, or can be loosened to facilitate release for removal and installation purposes.

Figure 2:
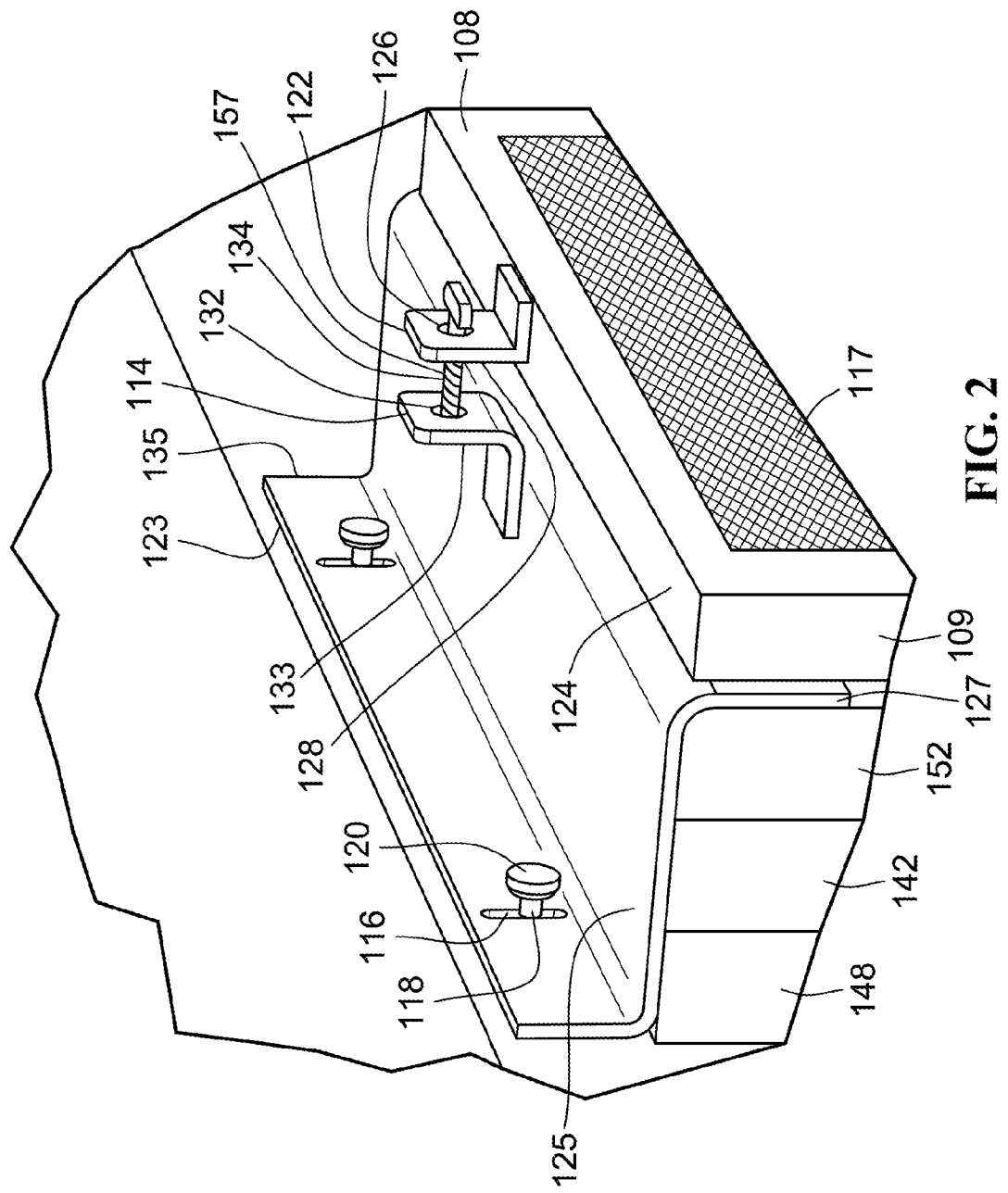
FIG. 2 is a close up view of a portion of the filter housing of FIG. 1.

In an embodiment of the invention illustrated in FIG. 2, each pivoting door 106, 108 also includes a first L-shaped bracket 122 attached to a top side 124 of the pivoting door 106, 108. The first L-shaped bracket 122 has a hole or opening 126 in a vertical portion 128 of the first L-shaped bracket 122. As stated above, each upper retainer 135 includes the latch 114, which in at least one embodiment is second L-shaped bracket 114 with a hole or opening 132 in a vertical portion 134 of the second L-shaped bracket 114. The opening 132 in each of the second L-shaped brackets 114 aligns with the opening 126 in the corresponding first L-shaped bracket 122 such that a locking bolt 134 can be inserted through both openings 126, 132 to hold the pivoting door 106, 108 in the closed or shut position. At least opening 132 (or potentially both openings) are threaded such that locking bolt 134 (with a knob such as t-handle) can be selectively secured and released.

In the embodiment shown in FIG. 2, each upper retainer 135 has a mounting portion 123, a spacer portion 125, and a retainer portion 127. The mounting portion 123 is attached to the top of the front side 101 of the housing 100 and defines the slots 116. The spacer portion 125 is configured to accommodate the flange 142 and gasket seals of the V-bank filter element 138. The retainer portion 127 is configured to keep the aforementioned V-bank flange 142 and associated gasket seals in sealing engagement with a seating surface 144 (shown in FIG. 3) around the perimeter of the rectangular openings 102, 104 of the housing 100. By manually actuating the knob 120, the V-bank filter element 138 can be secured and sealingly clamped with axial compression in the gaskets against the front seating surface 144 of the housing 100, or can be loosened to facilitate release for removal and installation purposes. Actuating the knob 120 can also secure the panel pre-filter 136 (shown in FIG. 3) in the grate 117 by compressing the V-bank filter element 138 gaskets against the panel pre-filter 136.

In FIG. 2, an embodiment of the invention is illustrated in which each pivoting door 106, 108 also includes a first L-shaped bracket 122 attached to a top side 124 of the pivoting door 106, 108. The first L-shaped bracket 122 has a hole or opening 126 in a vertical portion 128 of the first L-shaped bracket 122. As stated above, each upper retainer 135 includes the latch 114, which in at least one embodiment is second L-shaped bracket 114 with a hole or opening 132 in a vertical portion 133 of the second L-shaped bracket 114. The opening 132 in each of the second L-shaped brackets 114 aligns with the opening 126 in the corresponding first L-shaped bracket 122 such that a locking bolt 134 can be inserted through both openings 126, 132 to hold the pivoting door 106, 108 in the closed or shut position. At least opening 132 is threaded, or potentially both openings are threaded such that locking bolt 134 having a threaded portion 157 (with a knob such as t-handle) can be selectively secured and released.

Figure 3:
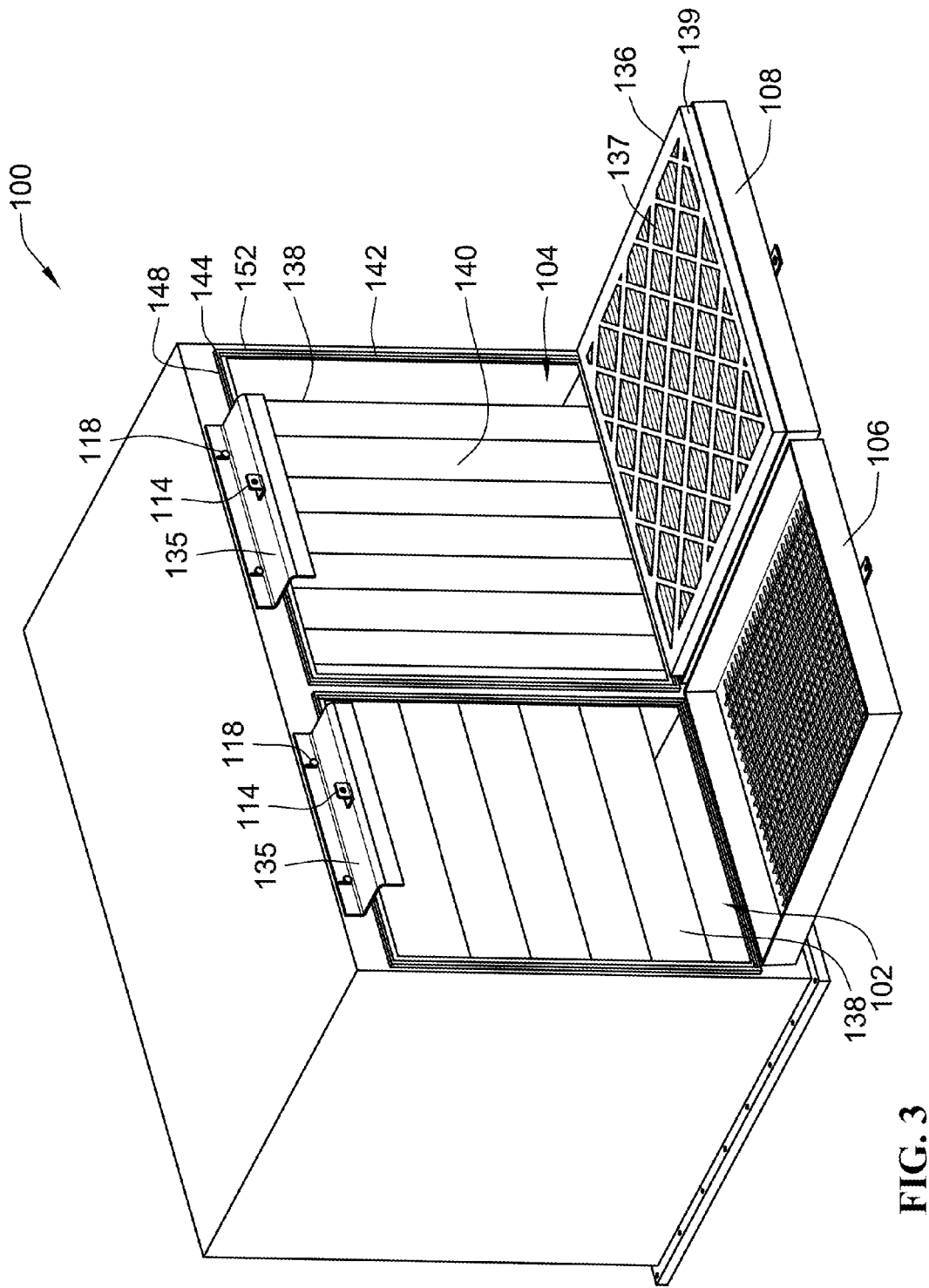
FIG. 3 is a perspective view of the filter housing of FIG. 1 with a V-bank filter and panel filter therein and the door open.

FIG. 3 illustrates the filter housing 100 of FIG. 1 with exemplary filter elements installed therein. Because the illustrated embodiment of the filter housing 100 is configured with two similar openings, doors, upper retainers and latches, only one side of the filter housing 100 and corresponding filter elements will be described below, as the description will be the same for the other side of the filter housing 100. Pivoting door 108 is shown with the panel pre-filter 136 installed within the frame 109 of the pivoting door 108, though in normal operation, each pivoting door 106, 108 would have the panel pre-filter 136 installed therein. When the door 106, 108 is in the open position and during movement to the closed position (with the hinge to the door at the bottom), the panel pre-filter 136 rests in position via the forces of gravity such that no additional clamping is even required and the panel pre-filter 136 may be simply laid into the nesting position along the L shaped seating surface 121 and easily removed therefore as well. Further, one step securement of the pre-filter 136 is accomplished with the latch 114 upon closure of the door 106, 108.

Further as an advantage, as can be seen in FIG. 3, one side of the panel pre-filter 136 is protected by the grate 115 of the pivoting door 108, while the other side of the panel filter is positioned adjacent to a V-bank filter element 138 when the pivoting door 108 is in the closed position. In a particular embodiment, the generally rectangular panel pre-filter 136 fits loosely into the frame 109 of the pivoting door 108, and is secured in place only when the pivoting door 108 is closed. In an alternate embodiment, the panel pre-filter 136 is held in by fastening devices (not shown) disposed on the frame 109 of the pivoting door 108, or the panel filter may be press fit into the frame 109 of the pivoting door 108, and held in place by friction.

When positioned upstream from the V-bank filter element 138 within the frame 109 of the door 106, 108, the panel pre-filter 136 is configured to pre-filter air entering into the V-bank filter element 138 by removing relatively larger particles and dust from the air stream, for example, before those larger particles can enter the V-bank filter element 138. One effect of the pre-filtering panel pre-filter 136 is to lengthen the useful life of the V-bank filter element 138. In some embodiments of the invention, the panel pre-filter 136 includes pleated pre-filter media 137 housed within a rectangular paperboard frame 139. Further, in certain embodiments the panel pre-filter media 137 is rated at MERV 14 or lower.

Figure 4:
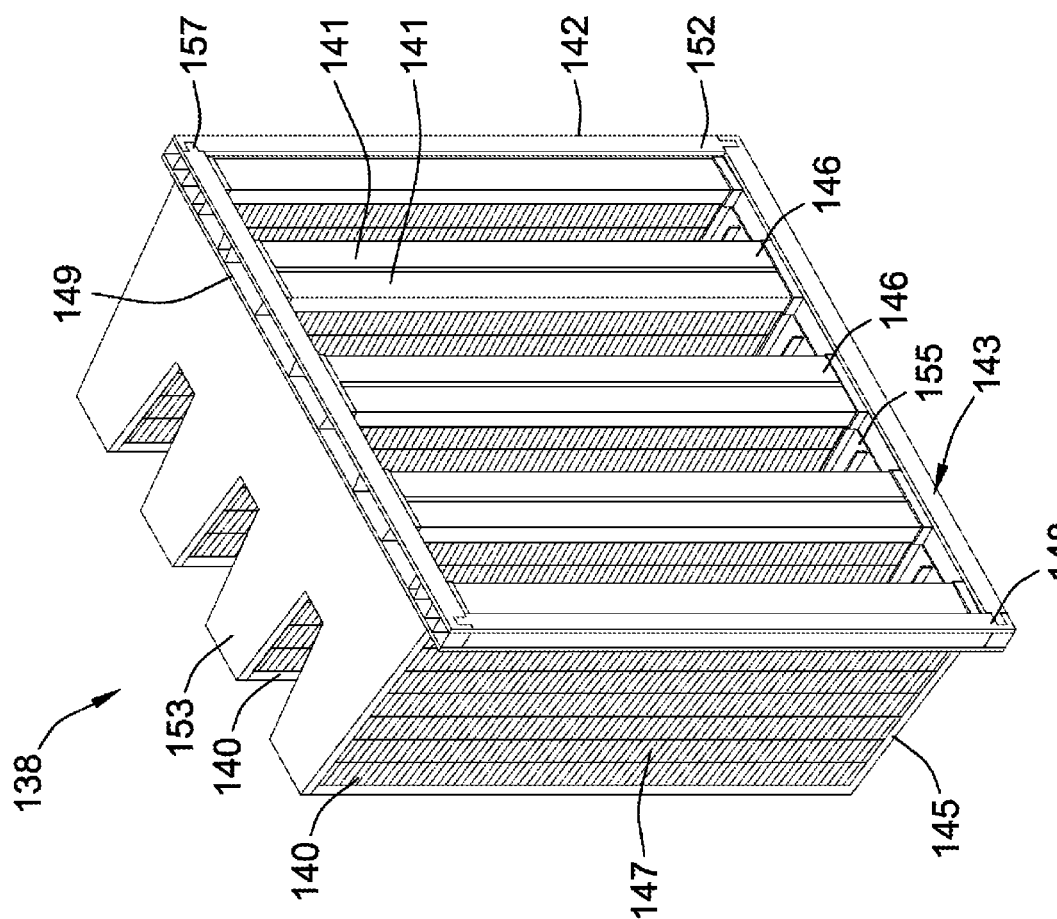
FIG. 4 is a perspective view of a V-bank filter, constructed in accordance with an embodiment of the invention.

Referring now to FIG. 4, which illustrates a perspective view of the V-bank filter element 138 constructed in accordance with an embodiment of the invention. The V-bank filter 138 comprises a series of panel filters 140 each having a frame 145 supporting a pleated filter media 147 panel. In some embodiments of the invention the filter media 147 is pleated and the frame 145 is constructed of a rigid material such as plastic, although paperboard frames are more common for pleated panel filter elements. The entire assembly which comprises the V-bank filter element 138 is supported by a frame having a peripheral and outwardly projecting rectangular flange 142, in which each panel filter 140 is attached to the adjacent panel filter 140 along a side edge 141, and the panel filters 140 are angled such that any two adjacent panel filters 140 come together in a V-shaped configuration. In at least one embodiment of the invention, adjacent ends or side edges 141 of adjacent panel filters 140 are joined by bridging sections 146 that extend transversely relative to two opposed sides of the edges of the flange 142. A top panel 153 and bottom panel 155 (also referred to as end panels) cover the top and bottom portions, respectively, of the V-bank filter element 138, and the panels 153, 155 create a seal with each of the panel filters 140 such that air flowing into the V-bank filter element 138 must flow through the filter media 147. It is also contemplated that non-pleated filter panels may also be used to construct the V-bank filter element 138, such as a collection of other panel filters arranged in a V-bank configuration.

The flange 142 may be formed from a rigid material such as a hard plastic or metal. In at least one embodiment, the flange 142 is integrally formed with end panels 153, 155. A first seal 148 is disposed on a back surface 149 of the flange 142, and a second seal 152 is disposed on a front surface 151 of the flange. The V-bank configuration allows for relatively high amount of filter media surface area per a given volume while permitting a reasonably high air flow rate through the filter assembly. This configuration has proven effective at sufficiently trapping certain airborne viruses that can affect livestock held in animal confinement facilities.

Referring again to FIG. 3, the V-bank filter element 138 is shown in rectangular openings 102, 104 of filter housing 100. As can be seen from FIG. 3, the V-bank filter element 138 can be placed in the filter housing 100 such that the panel filters 140 of the V-bank filter are arranged either vertically or horizontally. In either configuration, an airstream flowing through the inlet openings 102, 104 of the filter housing, flows through the V-bank filter element media and out of the outlet opening 119 in the bottom side 105 of the filter housing 100.

As explained above, the V-bank filter 138 includes the flange or frame 142 along a front side 143 (shown in FIG. 4) of the V-bank filter element 138. The flange 142 is configured to seat against a perimeter portion, or seating surface, 144 of rectangular opening 104. In the embodiment of FIG. 3, the flange 142 is generally rectangular and is in general alignment with the seating surface 144, and each of the plurality of panel filters 140 projects away from the flange 142 towards the interior of the filter housing 100.

In at least one embodiment of the invention, the V-bank filter element 138 uses a MERV 16 filter media 147 (shown in FIG. 4), such as would be found in a 95% DOP (Dispersed Oil Particulate) filter. A 95% DOP filter is configured to capture 95% of all particles of 0.3 micron in size. In an alternate embodiment a HEPA filter may be used as the V-bank filter media. A HEPA filter is configured to capture 99.97 of all particles of 0.3 micron in size, but will also result in a significantly greater pressure drop across the filter element compared to that across a 95% DOP filter.

To understand why these filter medias are effective at trapping airborne viruses affecting agricultural livestock, it helps to know the particle size of some typical viruses. For example, there are several swine-specific disease agents that affect pigs and hogs in animal confinement facilities, such as mycoplasma whose particle size typically ranges from 0.3 micron to 0.9 micron. Other swine-specific disease agents include the swine influenza virus whose particle size typically ranges from 0.080 micron to 0.120 micron, the porcine reproductive and respiratory syndrome virus (PRRSV) whose particle size typically ranges from 0.050 micron to 0.065 micron, and the porcine circovirus type 2 (PCV2) whose particle size typically ranges from 0.0017 micron to 0.0022 micron. Due to the small particle size of these viruses, high-efficiency filter medias are needed to filter these particles from the air.

To ensure that all airflow through the filter housing 100 flows through the panel pre-filter 136 and V-bank filter 138, in an embodiment of the invention, the first seal 148 is disposed between the flange 142 of the V-bank filter element 138 and the perimeter portion (i.e. seating surface 144) of rectangular opening 104. In at least one embodiment, the first seal 148 is substantially rectangular. Whereas, in at least one embodiment, the flange 142 is made from a rigid material such as a hard plastic or metal, the first seal 148 is made from a compliant material, such as rubber, for example, urethane, plastisol, nitrile or some other synthetic material having similar rubber-like properties, such that the first seal 148 is capable of creating an airtight seal between the seating surface 144 of rectangular opening 104 and the flange 142 of V-bank filter element 138. While the seals are shown to be flat, O-ring or other profiles known in the art may also be employed; and/or the seals may also be integrally formed on the frame/flange.

In certain embodiments of the invention, the second seal 152 is disposed between the flange 142 of the V-bank filter element 138 and the panel pre-filter 136 so as to create a seal therebetween. This second seal 152 however is less critical as the V-bank filter element 138 will also remove dust. Nevertheless, at least some sealing is desired at this location so as to route most if not all air first through the pre-filter. Whereas the first seal 148 is configured to seat against a side of the flange 142 facing the filter housing 100, the second seal 152 is configured to seat against a side of the flange 142 facing away from the filter housing 100. In an embodiment of the invention, the second seal 152 is substantially rectangular and made from a compliant material, such as described above with respect to the first seal 148. The second seal 152 also serve a seating function as the second seal 152 cooperates with the first seal 148 and the flange 142 to provide enough depth and resiliency in the structure overall ensure sufficient compression to create an airtight seal when the screws 118 tighten the upper retainer 135 against the front side of the housing. In embodiments of the invention, the first and second seals 148, 152 range from ⅛-inch to one inch in thickness, though in preferred embodiments, the thickness for these seals 148, 152 is approximately ¼ inch.

FIG. 5 shows an illustration of the filter system of FIG. 3 with the doors 106, 108 closed and each of the upper retainers 135 secured against the flange 142 of the corresponding V-bank filter element 138. Pivoting door 108 is shown along with the panel pre-filter 136 in relation to the frame 109 of the pivoting door 108, though in normal operation, each pivoting door 106, 108 would have the panel pre-filter 136 installed therein. One side of the panel pre-filter 136 is protected by the grate 117 of the pivoting door 108, while the other side of the panel filter is positioned adjacent to a V-bank filter element 138 when the pivoting door 108 is in the closed position.

The first seal 148, disposed between the flange 142 and the seating surface 144 of rectangular opening 104, creates a first airtight seal, and the second seal 152, disposed between the flange 142 and the panel pre-filter 136, creates a second seal. As can be seen in FIG. 5, the upper retainer 135, which can be raised when screws 118 are loosened to properly seat the flange 142 of the V-bank filter 138 against the first seal which is seated against seating surface 144, is in its lowest position as evidenced by the screws 118 located at the top of slots 116. When the screws 118 are tightened, the upper retainer 135 compresses the second seal 152, flange 142, and first seal 148 against the seating surface 144 to securely hold the V-bank filter 138 in place. The locking bolt 134 through first L-shaped bracket 122 and second L-shaped bracket 114 secures the door 108 in the closed position such that the panel pre-filter 136 is substantially aligned with the second seal 152, which, in turn, is seated against the flange 142.

FIG. 6 shows a cross-sectional view of a filter system 162, constructed in accordance with an embodiment of the invention. The cross-sectional view of FIG. 6 illustrates how the V-bank filter element 138 is held in the filter housing 100 via the flange 142 with a first seal 148 between the flange and housing 100, and with a second seal 152 between the flange 142 and step-shaped upper retainer 135. A second step-shaped lower retainer 159 is shown along the bottom side of the door 108 just above a hinge 158 for the door 108. Like the upper retainer 135, lower retainer 159 also includes a mounting portion, a spacer portion and a retainer portion, but it receives the lower portion of the flange 142 of the V-bank filter element 138 as opposed to the upper portion. Also, this lower retainer 159 is preferably permanently fixed along the bottom, such as being welded or fastened in place (although as similar adjustment means as for the upper retainer could be used—slots and fasteners). During installation or removal, the upper retainer 135 will be loosened to allow for clearance of the upper end of the V-Bank filter element 138. As a consequence, the lower portion of the flange 142, first seal 148, and second seal 152 can be wedged and pivotably installed (or removed) into the lower retainer 159 until the first seal 148 seats against the seating surface 144 of the housing 100. As such, the spacing portion of the lower retainer 159 is dimensioned just slightly smaller than the overall thickness of the V-bank flange 142 and gasket seals 148, 152 on either side.

It should be noted that the placement of the hinge 158 could just as easily be placed along the top side of the door 108, or along either lateral side of the door 108. However, as noted above, the bottom side mounting does provide an advantage of gravitational retention of the panel pre-filter 136 during installation and removal, avoiding secondary securing means. As can be seen from FIG. 6, the filter system 162 is configured such that air can enter the filter system 162 through either the front side 101 or rear side 107 through panel filters 136 and V-bank filter elements 138 located on either side. These air streams exit the filter system 162 through the outlet opening 119.

Figure 5:
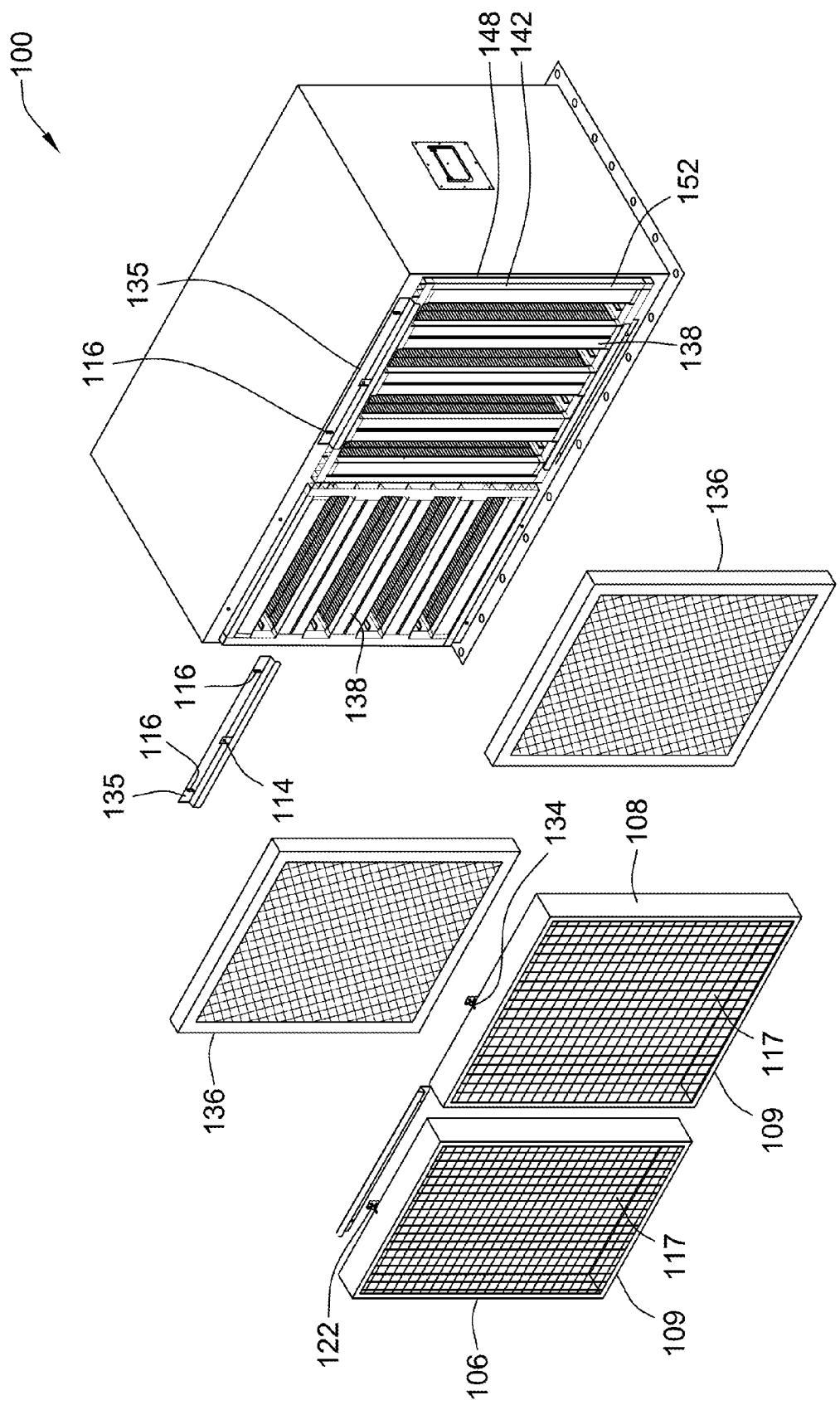
FIG. 5 is a perspective view of the filter housing of FIG. 1 with a V-bank filter and panel filter therein and the door closed.
Figure 7:
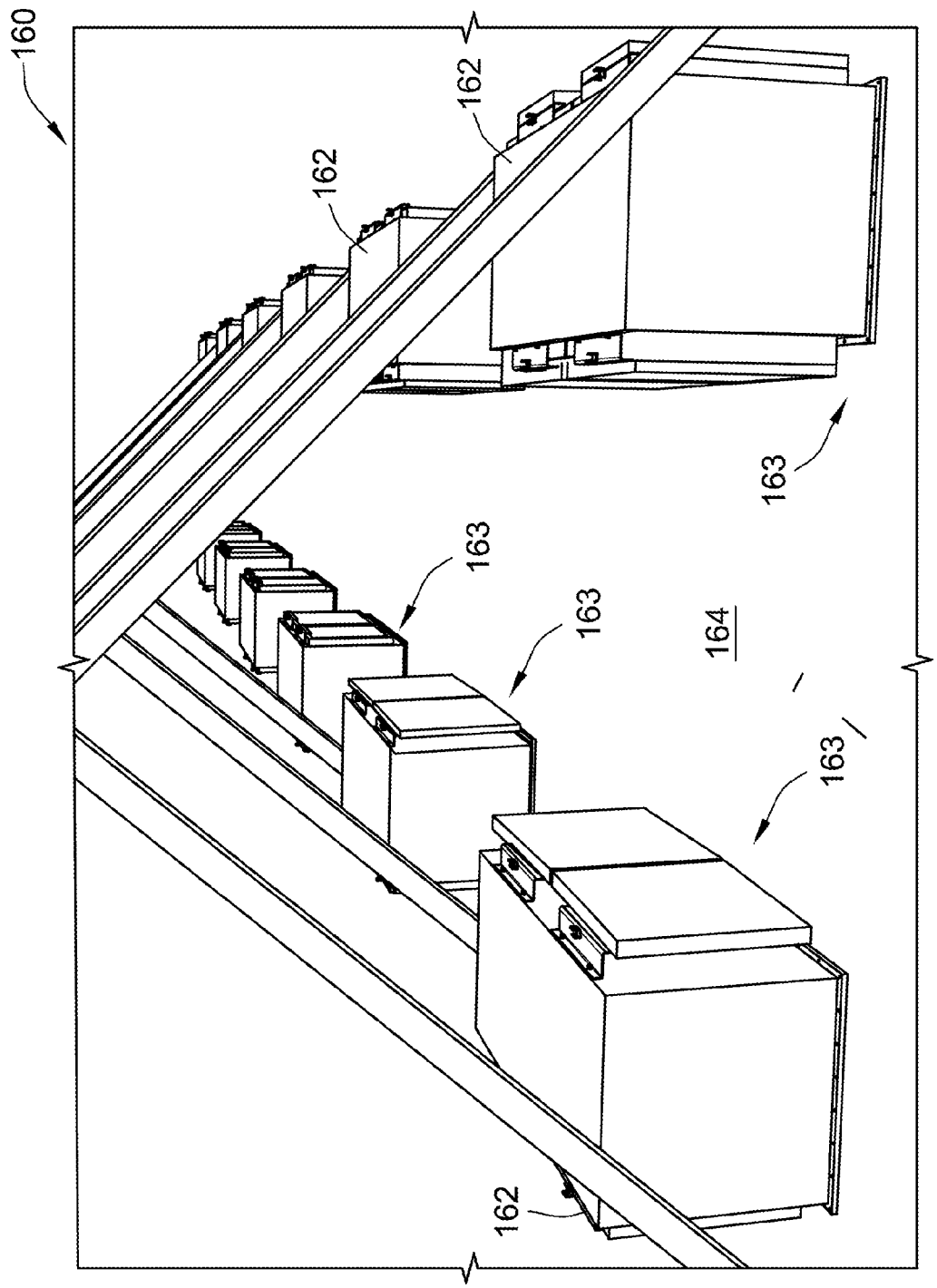
FIG. 7 is an exemplary embodiment of a portion of an animal confinement facility with a plurality of filter systems constructed in accordance with an embodiment of the invention.

FIG. 7 illustrates an exemplary embodiment of a portion of an animal confinement facility 160. The embodiment of FIG. 7 shows an attic portion of animal confinement facility 160 having a plurality of filter systems 162, constructed in accordance with an embodiment of the invention. Each of these exemplary filter systems 162 comprise the filter housing 100 (shown in FIG. 5), V-bank filter elements 138 (shown in FIG. 4), and panel filters 136 (shown in FIG. 5) described above. In the embodiment shown, the filter systems are installed through openings 163 in a floor 164 of the attic portion such that the filter systems 162 are visible in the ceiling (not shown) of that portion of the animal confinement facility 160 which houses the animals. It is contemplated that the filter systems 162 are configured to be used in both positive pressure air filtration systems and negative pressure air filtration systems.

As FIG. 7 shows, an animal confinement facility 160 may require a number of these filter systems 162 to properly filter the air in those facilities. As such, the ability to quickly and easily replace the V-bank filter elements 138 and pre-filtering panel filters 136, afforded by embodiments of the present invention, can reduce the amount of time needed to maintain the filter system and result in significant cost savings when compared to conventional filtering systems in which the entire housing and all filter elements therein are replaced as a unit.

Figure 8:
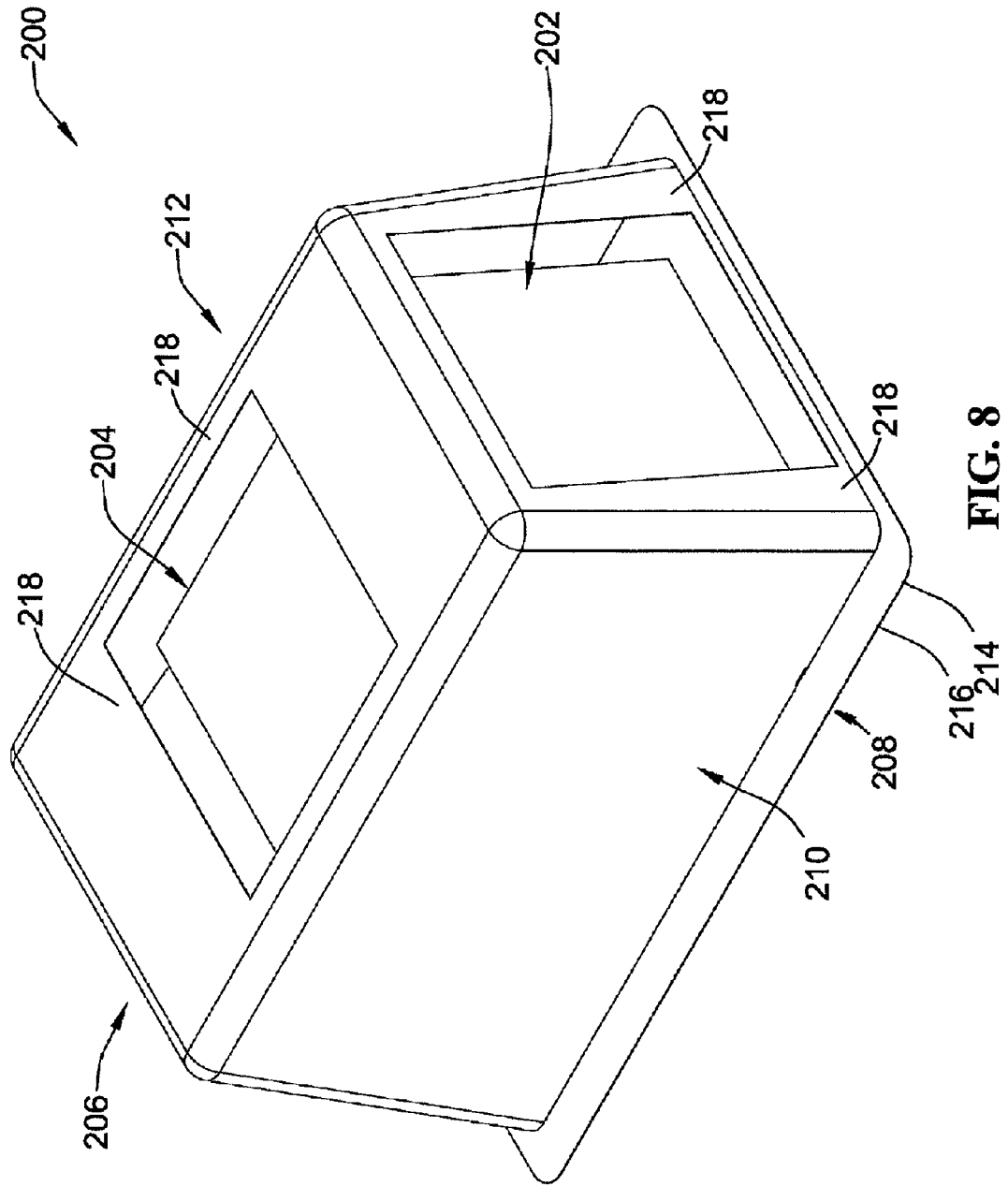
FIGS. 8-10 illustrate perspective views of various embodiments of a molded plastic filter housing, constructed in accordance with an embodiment of the invention.
Figure 9:
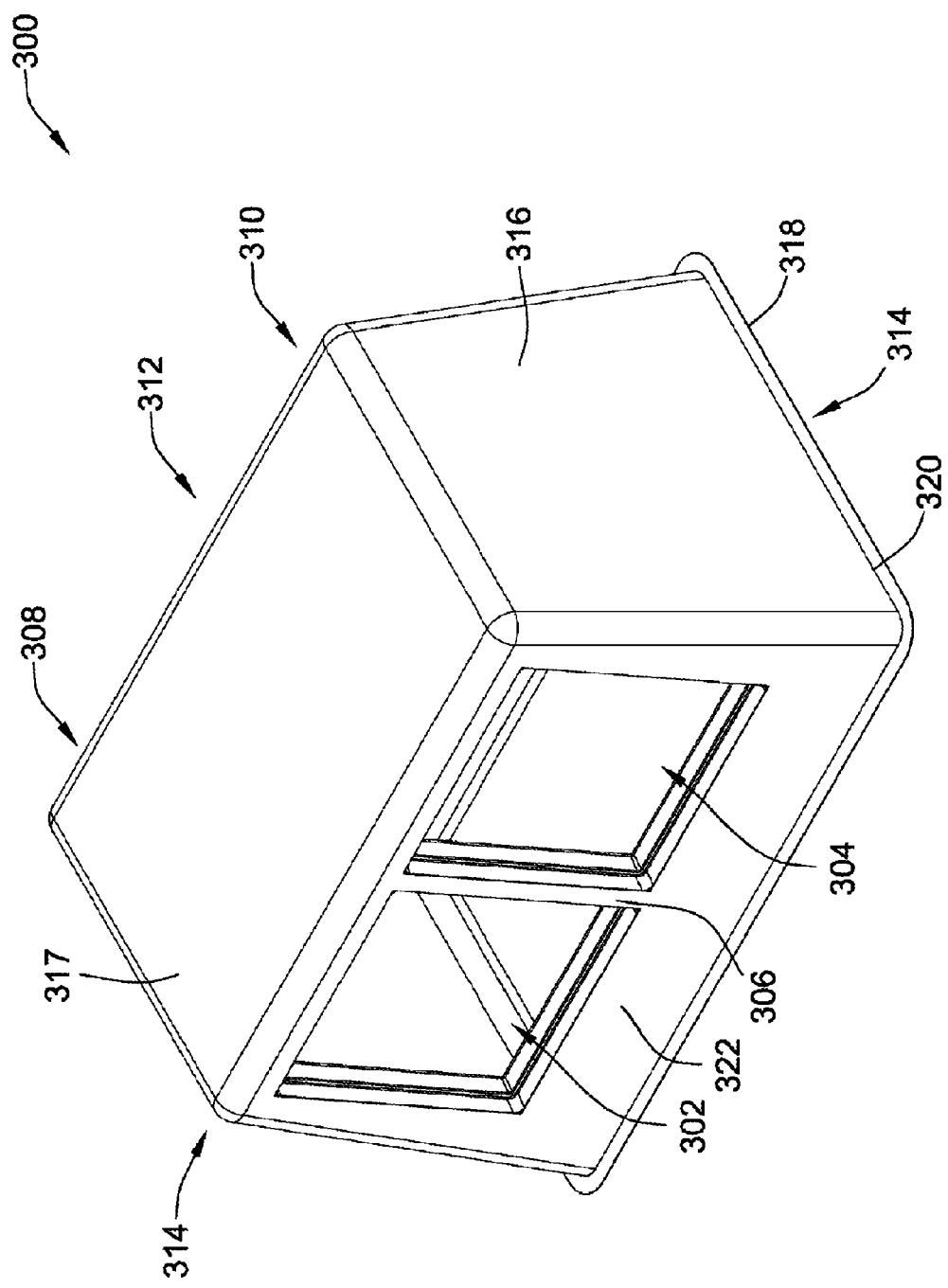
Figure 10:
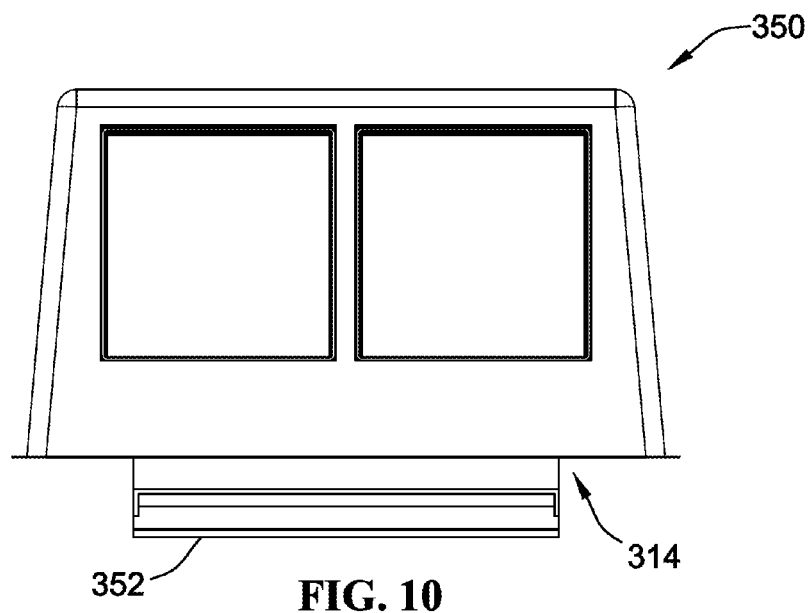

FIGS. 8-10 illustrate various embodiments of molded plastic filter housings constructed in accordance with embodiments of the invention. FIG. 8 shows a molded filter housing 200 with an lateral-side inlet opening 202 and a top-side inlet opening 204. Some embodiments of molded filter housing 200 include an optional second lateral-side opening 206. Around each opening 202, 204, 206 on the outside of the filter housing 200, there is a seating surface 218 configured to accommodate a V-bank flange 142 (shown in FIG. 4). Molded filter housing 200 further includes a bottom side outlet opening 208. In at least one embodiment, the molded filter housing 200 has no openings in the front side 210 or back side 212. Edges and corners for the substantially box-shaped filter housing 200 are rounded. A flange 214 runs around a perimeter 216 at the base of the filter housing 200. In an embodiment of the invention, the flange 214 has openings for fasteners, which may be used, for example, in the installation of the filter housing 200.

FIG. 9 shows a molded filter housing 300 with two adjacent front-side inlet openings 302, 304 separated by a first vertical divider 306 and two back-side inlet openings 308, 310 separated by a second vertical divider 312. While the back-side inlet openings 308, 310 and vertical divider 312 are not visible in FIG. 9, each is substantially similar to the inlet openings 302, 304 and divider 306 shown on the front side. Around each opening 302, 304, 308, 310 on the outside of the filter housing 300, there is a seating surface 322 configured to accommodate a V-bank flange 142 (shown in FIG. 4). Molded filter housing 300 further includes a bottom-side outlet opening 314. In at least one embodiment, the molded filter housing 300 has no openings in the lateral sides 316, or in top side 317. Edges and corners for the substantially box-shaped filter housing 300 are rounded. A flange 318 runs around a perimeter 320 at the base of the filter housing 300. In an embodiment of the invention, the flange 316 has openings for fasteners, which may be used, for example, in the installation of the molded filter housing 300.

Figure 11:
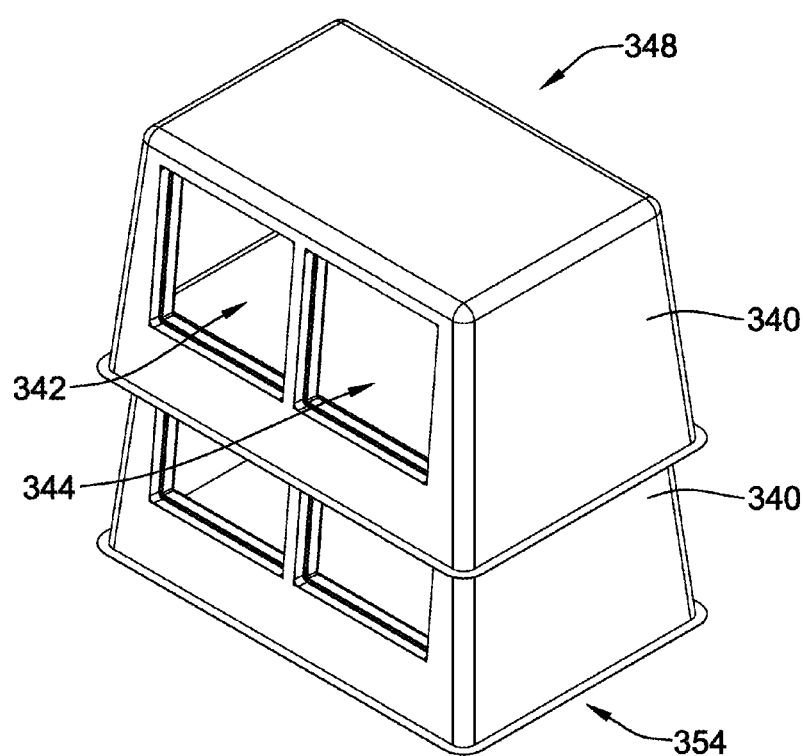
FIGS. 11-12 provide illustrations of the plastic filter housings of FIGS. 8-10 in which the filter housings are nested.

FIG. 10 illustrates an alternate embodiment of the molded plastic filter housing of FIG. 9. The FIG. 10 molded plastic filter housing 350 includes a covering 352 for outlet opening 314. FIG. 11 illustrates the molded filter housing 340 showing the potential for the nesting of multiple molded filter housings 340 such that the storage and transportation of these molded filter housings 340 may be more efficient than that for filter housings which are not nestable. In the embodiment of FIG. 11, filter housings 340 each have four inlet openings 342, 344, 348, 350 capable of accommodating four V-bank filter elements 138 (shown in FIG. 4). Each filter housing 340 has a bottom-side outlet opening 354, which constitutes substantially the entire bottom side of the filter housing 340. Opening up the entire bottom side of the filter housing 340 facilitates the aforementioned nestability. Other filter housing configurations may also be nestable in this fashion. For example, the two-filter housing 200 of FIG. 8 and the filter housing 300 of FIG. 9 can be made such that the filter housings 200, 300 are nestable.

Figure 12:
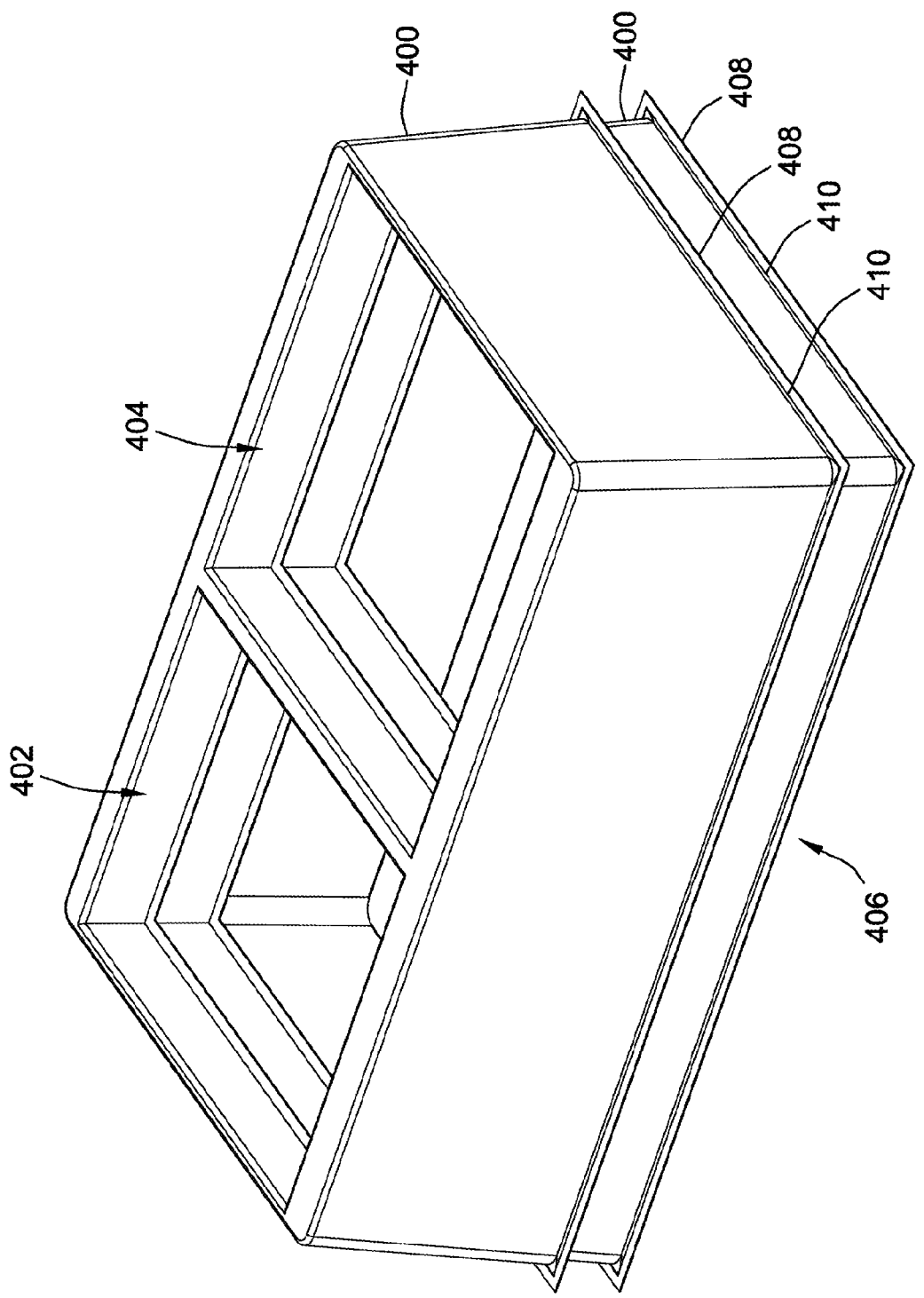

FIG. 12 illustrates an alternate embodiment of a molded filter housing 400 nested with a second molded filter housing 400. Molded filter housing 400 has two adjacent top-side inlet opening 402, 404 and further includes a bottom-side outlet opening 406 and rounded edges and corners. In at least one embodiment, molded filter housing 400 has no inlet openings on the front, back, or lateral sides. A flange 408 runs around a perimeter 410 at the base of the filter housing 400.

The molded plastic filter housings of FIGS. 8-12 may be made by rotational molding or blow molding, as well as conventional injection molding techniques. Rotational molding and blow molding may be used to improve the uniformity of wall thickness and to reduce porosity in molded parts. Constructing these filter housings from thermoplastic makes the filter housing less susceptible to rust, corrosion and rot. Further, by constructing the filter housing a single molded piece with no assembly required, manufacturing of the housings may be faster and less expensive. Additionally, the molded filter housings have no seams or leaks associated therewith that would allow for the bypass of unfiltered air.

Another feature of molded filter housings, namely the smooth seam-free interior and round corners and edges, result in high flow-through rates for airstreams flowing within the housings. Furthermore, the rounded edges and corners allow for the interior of the filter housing to be more easily clean than many conventional filter housings, and generally provide fewer areas for bacterial growth than conventional filter housings. In embodiments of the invention, molded filter housings may include features that facilitate the rapid assembly of pivoting doors over the inlet openings, and of retaining mechanisms for securing a V-bank filter in the filter housings.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter system, comprising:
   a housing having a generally rectangular inlet opening through one side thereof, and an outlet opening through a different side, the rectangular inlet opening being surrounded by a generally rectangular sealing surface;
   a door having a generally rectangular seating surface, the seating surface surrounding a thru-port opening, the door movable between an open position and a closed position relative to the housing, the through port opening being aligned with the rectangular inlet opening when the door is in the closed position;
   a hinge connecting the door to the housing, wherein the door pivots between open and closed positions about the hinge;
   a generally rectangular panel pre-filter seated along the rectangular seating surface of the door;
   at least one V-bank primary filter positioned in the rectangular inlet opening, the at least one V-bank primary filter having a generally rectangular peripheral flange in general alignment with the generally rectangular sealing surface, the at least one V-bank primary filter having a plurality of filter media sections projecting away from the peripheral flange and into the interior of the housing;
   a latch having cooperating components between the door and the housing, adapted to keep the at least one generally rectangular panel pre-filter positioned inline and upstream of the at least one V-bank primary filter; and
   a seal between the generally rectangular peripheral flange of the at least one V-bank primary filter and the generally rectangular sealing surface.

2. The filter system of claim 1, wherein the hinge is positioned along one of a bottom side of the door wherein the panel pre-filter nests during movement between open and closed positions via gravity.

3. The filter system of claim 1, further including opposed retainers along the housing on opposite sides of the rectangular inlet opening, each retainer being step-shaped comprising a mounting portion, a spacer portion, and a retainer portion, the mounting portion configured to facilitate the attachment of the retainer to the housing, the spacer portion configured to accommodate the generally rectangular peripheral flange and the seal.

4. The filter system of claim 1, wherein the door further comprises a wire mesh grate in the through-port opening, the wire mesh grate supported by a frame of the door.

5. The filter system of claim 1, further comprising:
   a second door having a generally rectangular seating surface, the seating surface surrounding a through-port opening, the second door movable between an open position and a closed position relative to housing, the through-port opening being aligned with a second rectangular inlet opening in the housing when the second door is in the closed position, the second rectangular inlet opening having a generally rectangular sealing surface;
   a second generally rectangular panel pre-filter seated along the rectangular seating surface of the second door; and
   a second V-bank filter positioned in the second rectangular inlet opening, the second V-bank filter having a generally rectangular peripheral flange in general alignment with the generally rectangular sealing surface of the second rectangular inlet opening, the second V-bank filter having a plurality of filter media sections projecting away from the second V-bank filter flange and into the housing, the second rectangular inlet opening being adjacent to the generally rectangular inlet opening and separated from the generally rectangular inlet opening by a divider.

6. The filter system of claim 1, wherein the housing is generally box shaped and has doors and filters on opposed sides thereof, further including an outlet opening through a bottom side.

7. The filter system of claim 1, wherein the filter media sections comprise at least a MERV 16 filter media, and wherein the MERV 16 filter media comprises one of a 95% DOP filter and a HEPA filter.

8. The filter system of claim 1, further comprising a second seal disposed between the generally rectangular peripheral flange and the latch, wherein the seal means and the second seal are made from a compliant material configured to facilitate the creation of an airtight seal between the V-bank primary filter and the housing.

9. The filter system of claim 1, wherein the housing further comprises:
a second rectangular inlet opening and a second pivoting door with a through-port opening being aligned with the second rectangular inlet opening when the second door is in the closed position, the second rectangular inlet opening being located on a side of the housing opposite the generally rectangular inlet opening;
a hinge connecting the second door to the housing such that the second door pivots between open and closed positions about the hinge;
a panel pre-filter seated along a seating surface of the second door;
a second V-bank filter positioned in the rectangular inlet opening, the second V-bank primary filter having a V-bank flange, and having a plurality of filter media sections projecting away from the V-bank flange and into the interior of the housing;
a second latch having cooperating components between the door and the housing, the second latch adapted to secure the second door in the closed position; and
a second seal between the V-bank flange of the second V-bank filter and a second sealing surface of the housing.

10. A filter system comprising:
a housing having an inlet opening and an outlet opening;
a V-bank filter having a flange configured to seat against a perimeter portion of the inlet opening, and disposed between the inlet and outlet opening;
a pair of cooperating retainers, including a first retainer and a second retainer on opposing sides of the inlet opening, each retainer being generally step shaped, with a mounting portion, a spacer portion and a retainer portion, the mounting portion being mounted to the housing with the spacer portion spacing retainer portion away from the perimeter portion in spaced relation to trap the flange of the V-bank filter therein, at least one of the retainers being movable to accommodate installation and removal of the V-bank filter; and
a seal disposed between the flange and the perimeter portion of the housing;
wherein the mounting portion of the moveable retainer includes an elongate slot; further comprising a manually operated fastener received in the elongate slot and fastened to the housing, the mounting portion moveable along a first axis relative to the housing by sliding movement of the fastener in the slot, the manually operated fastener moveable between clamped and unclamped positions allowing the mounting portion to be moveable toward and away from the housing for adjustment along a second axis, the clamped positioned clamping the V-bank filter against the housing.

11. The filter system of claim 10, further comprising a pivoting door hinged to the housing and configured to move between an open position and a closed position, wherein, in the closed position, the door covers the inlet opening, and wherein, in the open position, the door allows for the removal and installation of the V-bank filter; and
a panel filter disposed within the pivoting door and configured to pre-filter air entering through the inlet opening to the V-bank filter, the panel filter being arranged over the flange and the retainer portions of the pair of cooperating retainers when in the closed position.

12. The filter system of claim 10, wherein one of the cooperating retainers is fixed to the housing, wherein the V-bank filter is pivoted and wedge into the fixed retainer during installation when the movable retainer is in the unclamped position.

13. A filter system comprising:
a housing having an inlet opening and an outlet opening;
a V-bank filter having a flange configured to seat against a perimeter portion of the inlet opening, and disposed between the inlet and outlet opening;
a pivoting door configured to move between an open position and a closed position, wherein, in the closed position, the door covers the inlet opening, and wherein, in the open position, the door allows for the removal and installation of the V-bank filter; and
a panel filter disposed within the pivoting door and configured to pre-filter air entering through the inlet opening to the V-bank filter.

14. The filter system of claim 13, further comprising a seal disposed between the V-bank filter flange and the perimeter portion of the inlet opening so as to create an airtight seal therebetween.

15. The filter system of claim 13, wherein the pivoting door is attached to the housing via a hinge along one of a bottom side of the door, wherein the panel pre-filter nests during movement between open and closed positions via gravity.

16. The filter system of claim 13, further comprising a seal attached to a surface of the V-bank flange, and at least one retainer for holding the seal and flange of the V-bank filter in sealing engagement with the housing.

17. The filter system of claim 13, wherein the housing further comprises a second inlet opening opposite the first inlet opening, and a second V-bank filter disposed between the second inlet opening and the outlet opening, wherein the outlet opening is located in bottom side of the housing.

18. The filter system of claim 13, wherein the V-bank filter comprises a plurality of pleated panel filters, each panel filter supported by the generally rectangular frame, each pair of adjacent pleated panel filters being arranged in a generally V-shaped configuration, wherein each of the plurality of pleated panel filters comprises a MERV 16 filter media.

19. The filter system of claim 13, further comprising a pair of cooperating retainers, including a first retainer and a second retainer on opposing sides of the inlet opening, each retainer being generally step shaped, with a mounting portion, a spacer portion and a retainer portion, the mounting portion being mounted to the housing with the spacer portion spacing retainer portion away from the perimeter portion in spaced relation to trap the flange of the V-bank filter therein, at least one of the retainers being movable to accommodate installation and removal of the V-bank filter.

* * * * *